United States Patent
Suzuki et al.

[11] Patent Number: 6,153,021
[45] Date of Patent: Nov. 28, 2000

[54] METHOD OF BRAZING ALUMINUM

[75] Inventors: Toshihiro Suzuki, Numazu; Tsunehiko Tanaka; Meitoku Ogasawara, both of Fuji, all of Japan

[73] Assignee: Nippon Light Metal Company Ltd., Tokyo, Japan

[21] Appl. No.: 09/033,321

[22] Filed: Mar. 2, 1998

Related U.S. Application Data

[63] Continuation-in-part of application No. 08/707,426, Sep. 4, 1996, abandoned.

[30] Foreign Application Priority Data

Sep. 22, 1995 [JP] Japan ................................ 7-269262

[51] Int. Cl.[7] .................................................. C23C 22/00
[52] U.S. Cl. .............................. 148/252; 148/23; 148/22
[58] Field of Search .............................. 148/252, 24, 243, 148/240, 23, 22

[56] References Cited

U.S. PATENT DOCUMENTS

| | | | |
|---|---|---|---|
| 3,858,302 | 1/1975 | Horbury et al. | 29/490 |
| 3,858,303 | 1/1975 | Horbury et al. | 29/490 |
| 4,556,165 | 12/1985 | Yamawaki et al. | 228/223 |
| 4,981,526 | 1/1991 | Kudo et al. | 148/25 |
| 5,100,048 | 3/1992 | Timsit | 229/198 |

FOREIGN PATENT DOCUMENTS 674966  10/1995  European Pat. Off. .

*Primary Examiner*—Patrick Ryan
*Assistant Examiner*—M. Alexandra Elve
*Attorney, Agent, or Firm*—Heslin & Rothenberg, P.C.

[57] ABSTRACT

A brazing material comprising a mixture of aluminum brazing powder (i.e. Si, Zn, Cu or Ge), flux, binder, and alcohol for diluting the binder is coated on a surface of an extruded flat tubed strip of aluminum type and this and aluminum type fins are brazed together.

8 Claims, 2 Drawing Sheets

METHOD OF BRAZING ALUMINUM

CROSS-REFERENCE TO RELATED APPLICATION

This is a continuation-in-part of application Ser. No. 08/707,426, filed Sep. 4, 1996 now abandoned.

FIELD OF THE INVENTION

The present invention relates to a method of brazing aluminum and an aluminum brazing material, and in particular, to a method of brazing aluminum and an aluminum brazing material for brazing a heat exchanging device of aluminum or aluminum alloy, hereinafter as aluminum type, and heat exchanging tubes of aluminum type material.

BACKGROUND OF THE INVENTION

Generally, an aluminum heat exchanger having aluminum type fins brazed on aluminum type heat exchanging tubes is used widely. Furthermore, in order to increase the heat exchanging rate, heat exchanging tubes are made of an extruded flat tubed strip of aluminum type material.

In order to manufacture a heat exchanging apparatus constructed as above, for brazing fins and an extruded flat tubed strip together, a method is used that coats brazing metallic powder on the aluminum surface and uses a flux for brazing; and as examples of this brazing method, there are known, first, a method of coating the brazing metallic powder and the flux powder separately, and second, a method of mixing the brazing metallic powder and the flux powder and then coating with this mixture.

However, there is a problem with the first method of coating the brazing metallic powder and the flux powder separately in that it involves very complicated processes. Furthermore, although the second method of coating the mixtures of brazing metallic powder and the flux powder has a lesser number of steps than the first method, there is a potential problem of not having a homogenous mixture of the powders. If the mixture is inhomogeneous, there is inadequate brazing material at a portion where there is a larger amount of flux, which leads to a residual flux remaining after brazing; on the other hand, there is a local melting of a substrate by an excess of brazing material and concomitant decrease in actual brazing because of a shortage of flux at a location where there is an excess of brazing metallic powder.

Furthermore, when the particle size of the brazing metallic powder is too large, there is a local melting of a substrate because of an excess of brazing material in certain parts. On the other hand, when the particle size of either the brazing metallic powder or the flux powder or both is too fine, particles easily aggregate, inducing inhomogeneity to cause the same type of problem associated with the second method above.

Furthermore, in a case where a binder is not used, there is a problem of peeling off after drying the coat. Moreover, when a liquid of low volatility such as water as a solvent medium for the mixture is used, there arise problems such as increase in time for drying and inhomogeneity and concentration differences.

The present invention is conceived with the above problems in mind. The purpose of the present invention is to provide an aluminum brazing method and aluminum brazing material that can braze uniformly and with ease and certainty.

SUMMARY OF THE INVENTION

In order to carry out the purpose as indicated above, a method of aluminum brazing features coating on a brazing surface an aluminum brazing material comprising a mixture of aluminum brazing Si powder, flux, binder, and alcohol for diluting the binder.

The binder, a thermal plastic acrylic copolymer where it is melted in an aliphatic alcohol of 1 to 8 carbons, evaporates without decomposition during the process of raising the temperature for brazing. Furthermore, it is usable as the brazing powder, Zn powder used for brazing by itself or Cu or Ge powder that contributes as brazing material by reacting with the aluminum surface and producing a low melting point metallic layer.

Furthermore, it would be desirable for the average particle diameter of the above brazing powder to be within the range of 2 to 60 $\mu$m. Moreover, it would be desirable for the ratio of the specific gravity of the brazing powder and the specific gravity of the flux to be (specific gravity of brazing powder/specific gravity of flux=) 0.7 to 1.3.

Still further, it would be desirable for the ratio of the particle size of the brazing powder and that of the flux powder to be (particle size of brazing powder/particle size of flux=) 0.7 to 1.3.

In the present invention, by coating on a surface to be brazed a mixture of aluminum brazing powder (consisting solely of Si, Zn, Cu or Ge powder), flux, binder, and alcohol for diluting the binder, the flux coating process and the brazing powder coating process can be executed together at once, and moreover, by using the binder, the problem of coat peeling off after drying the coating of the mixture of brazing powder and the flux can be prevented.

DESCRIPTION OF THE PREFERRED EMBODIMENT

Below, the present invention is explained based on the figures provided. The explanation is given in a case where the present invention is utilized as an aluminum type heat exchanging apparatus.

Figure 1:
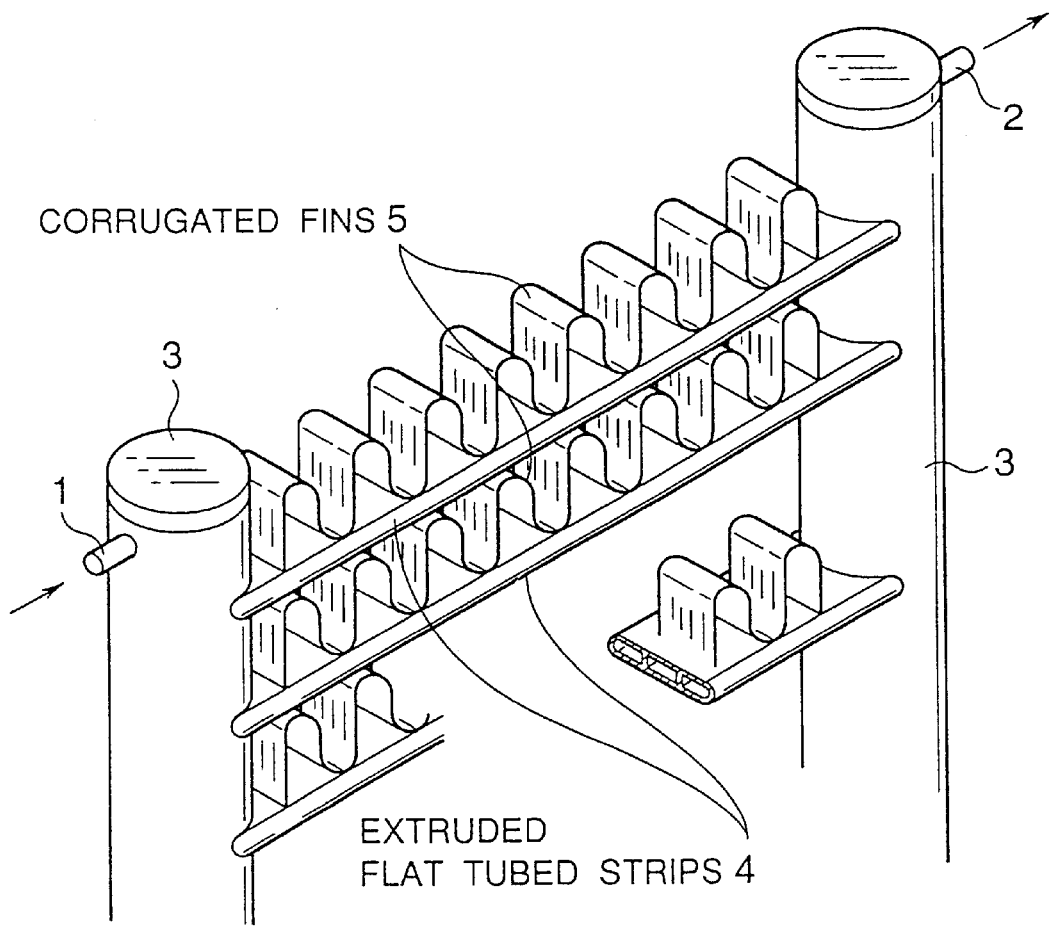
FIG. 1 shows a perspective schematic drawing of an example of a brazing heat exchanging apparatus in connection with the brazing method of the present invention.

As shown in FIG. 1, the heat exchanging apparatus comprises a pair of header pipes 3 having either an inlet 1 or an outlet 2 for a heat medium, extruded flat tubed strips 4 as heat exchanging tubes connected in parallel to the header pipes 3, and corrugated fins 5 disposed between the extruded flat tube strips 4. The header pipes 3 and the extruded flat tubed strips 4 are formed with aluminum alloy extruded material and the corrugated fins 5 are formed by bending aluminum alloy sheet material. The header pipes 3, the extruded flat tube strips 4, and the corrugated fins 5 are brazed together by the brazing method using the brazing material of the present invention to construct a heat exchanging apparatus.

Figure 2:
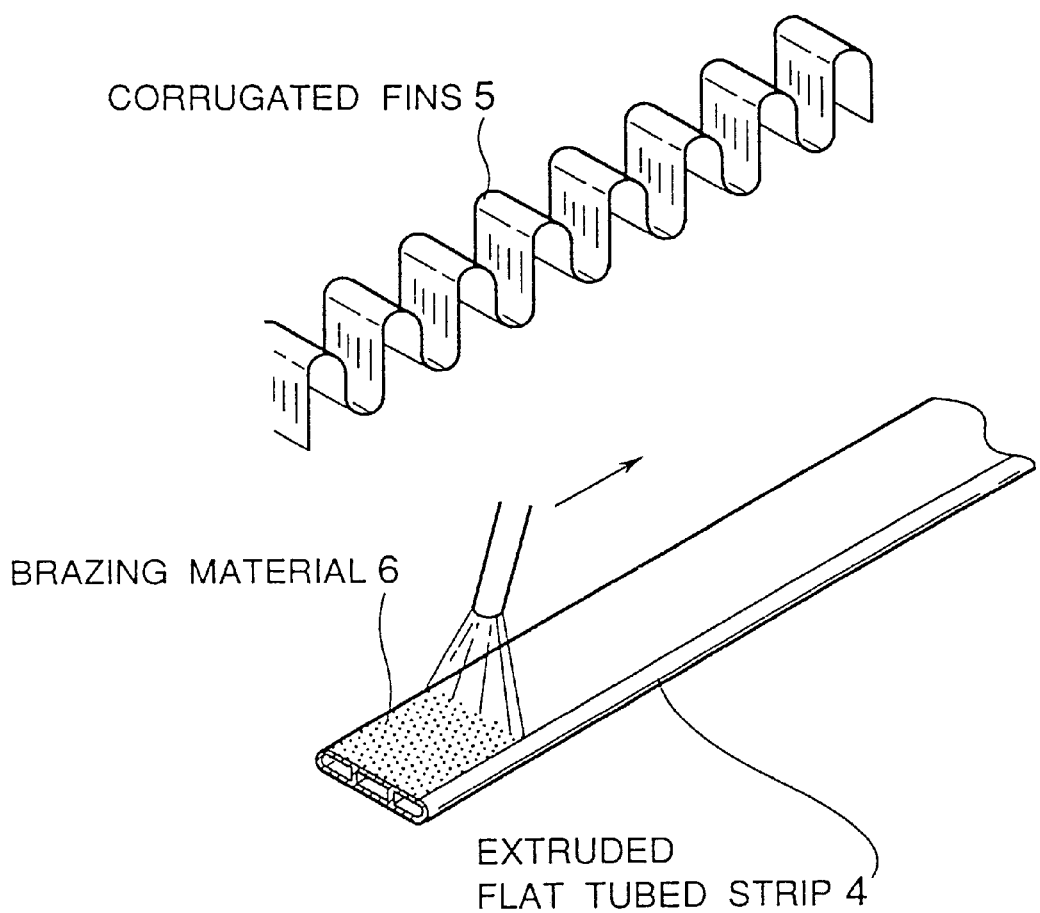
FIG. 2 shows separate perspective schematic drawings of an extruded flat tubed strip and fins to be brazed together by the brazing method of the present invention.

For example, in order to braze the above extruded flat tubed strips 4 and the corrugated fins 5, as shown in FIG. 2, the brazing material 6 of the present invention can be coated on the surface of the extruded flat tube strips 4 and the corrugated fins 5 can be brazed thereon.

The brazing material 6 is formed by a mixture of aluminum brazing powder, flux, binder, and alcohol for diluting the binder. In this case, the binder that satisfies the following requirements is used. That is, the binder must be a thermal plastic acrylic copolymer, such as PARALOID B-67 made by Rohm and Hass Company, must be miscible in an aliphatic alcohol of 1 to 8 carbons, and must evaporate without decomposition when the temperature is raised to an aluminum brazing temperature, such as 600° C.

As examples of alcohol for diluting the binder, there are methanol (methyl alcohol), ethanol (ethyl alcohol), propanol (isopropyl alcohol), butanol (butyl alcohol), and pentanol (amyl alcohol).

Furthermore, the aluminum brazing powder comprises Si, or Zn, an example of a metal that can be used for brazing by itself. Examples of a metal that can contribute to brazing by producing a low melting point metallic layer reacting with the aluminum surface are Cu or Ge.

The flux can either be a fluoride type flux or a sodium type flux, but the anticorrosive fluoride type flux is preferred between the two. Examples of the fluoride type flux are aluminum fluoride, fluoride of alkaline metal, fluoride of alkaline earth metal, and the following fluorine compounds: $KALF_4$, $K_2AlF_5 \cdot H_2O$, $K_3AlF_6$, $AlF_3$, $LiF$, $CaF_2$, $NaF$, $Li_3AlF_6$, $RbF$, $CsF$, $BaF_2$, $KF$, $BaF_2$ or a flux that have one or more of these compounds as the main ingredient.

Furthermore, the average particle size and the specific gravity of the aforementioned brazing powder and the flux powder should be within the range listed in the table below.

TABLE 1

|  | average particle size | specific gravity |
| --- | --- | --- |
| brazing powder | 2 ~ 60 μm | 2.0 ~ 3.0 |
| flux | under 60 μm | 2.0 ~ 3.0 |

Furthermore, the ratio of the specific gravity of the brazing powder and the specific gravity of the flux should satisfy eq. 1 below, and the ratio of the brazing powder particle size and the flux particle size should satisfy eq. 2 below.

Specific gravity of brazing powder/Specific gravity of flux= 0.7~1.3 (1)

Brazing powder particle size/Flux particle size=0.7~1.3 (2)

In the above, an explanation was given for a parallel flow type heat exchanging apparatus having a plurality of the extruded flat tubed strips 4 disposed in parallel between the pair of the header pipes 3 and the corrugated fins 5 between the extruded flat tubes strips 4, but the apparatus could just as well be a serpentine type heat exchanging apparatus having, as a heat exchanging tube, an extruded flat tubed strip bent in a serpentine manner and connected to header pipes and having fins disposed, in a similar manner as the corrugated fins 5, between interstices of the extruded flat tubed strip.

Next, an explanation on an experiment is given below involving coating and brazing on an aluminum surface under the changing conditions listed below for the brazing material of the present invention.
Conditions
Brazing material
 Binder: thermal plastic acrylic copolymer Product name: PARALOID B-67 (Rohm and Hass Company)
 Diluting liquid for binder: isopropyl alcohol
 Brazing powder: Si
 Flux: $KAlF_4$—$K_3AlF_6$
 Mixture compound (wt %)
  binder 6%
  isopropyl alcohol 76%
  Si 6%
  flux 12%
 Particle size (flux and brazing powders) <1, 1, 2, 10, 30, 50, 60, and 100 μm Results as shown in Table 2 was obtained from an experiment conducted under the conditions as indicated below for the brazing material as stipulated above.

Brazing experiment: coating the brazing material 6 on the aluminum extruded flat tubed strip 4 and brazing the corrugated fins 5 thereon.
Condition for brazing
 atmosphere: nitrogen gas
 highest temperature achieved: 610° C.
 fixing period: 3 minutes
Specification
 extruded flat tubed strip: A1050 20 mm (width)×2 mm (thickness)
 corrugated fin: A3003 0.115 mm (thickness)
Coated amount: 20 (g/m²)
 (Si+flux+binder)

| Si Average particle diameter (μm) | average flux particle diameter | | | | | | | |
| --- | --- | --- | --- | --- | --- | --- | --- | --- |
|  | <1 | 1 | 2 | 10 | 30 | 50 | 60 | 100 |
| <1 | X2 | X2 | X2 | — | — | — | — | — |
| 1 | X2 | Δ | Δ | X12 | — | — | — | — |
| 2 | X2 | Δ | ○ | ○ | Δ | X12 | X12 | X12 |
| 10 | Δ | ○ | ○ | ○ | Δ | X2 | X12 | X12 |
| 30 | X | Δ | Δ | ○ | ○ | ○ | X12 | X2 |
| 50 | — | Δ | Δ | Δ | ○ | ○ | Δ | X2 |
| 60 | — | — | — | X12 | Δ | Δ | X12 | X2 |
| 100 | — | — | — | — | X2 | X2 | X2 | X2 |

○: indicates a satisfactory result after the brazing experiment.
Δ: indicates a near satisfactory result after heating and brazing
X1: indicates an unsatisfactory brazing at various locations (excessive flux according to mixture inhomogeneity, deficiency in brazing).
X2: indicates localized melting (excessive brazing material in parts according to aggregation of fine brazing material, excessive brazing material in parts according to large particle size of brazing material).
X12: X1 + X2.
—: no brazing experiment conducted.

The result of the experiment indicated that a satisfactory brazing was obtained when the average particle size of the brazing powder is within the range of 2 to 60 μm and the ratio of the specific gravity of the brazing powder and the specific gravity of the flux and the ratio of the particle size of the brazing powder and the particle size of the flux were both between 0.7 and 1.3, inclusive.

Furthermore, a similar result was obtained when the diluting liquid of the binder for the aforementioned brazing material was switched from isopropyl alcohol to an aliphatic alcohol of 1 to 8 carbons. The reason for the aliphatic alcohol of 1 to 8 carbons is that when the number of carbon is greater than 9, solubility deceases and there is a tendency to become solid in water. A similar successful result was obtained when Zn, a metal other than Si, was used as a brazing material by itself or when a metal such as Cu or Ge contributing to the generation and brazing of a low melting point metal layer after reacting with an aluminum surface, was used or when a flux other than $KAlF_4$—$K_3AlF_6$, such as $KF$—$AlF_3$ was used.

In summary, according to the present invention, the processes of coating flux and coating brazing powder can be conducted simultaneously and the time and labor in connection with the brazing procedures can be reduced because the mixture of the aluminum brazing powder, the flux, the binder, and the alcohol for diluting the binder is coated on a brazing surface. Furthermore, because the binder is used, peeling after drying the coat can be prevented and, at the same time, a homogeneous and strong coat can be had.

What is claimed is:

1. An aluminum brazing method comprising the steps of: coating an aluminum type surface with a brazing material comprising a mixture of flux, binder, alcohol and a powder consisting essentially of Si; and brazing thereon.

2. The method of claim 1 wherein average particle size of said Si powder is within a range of 2 to 60 $\mu$m.

3. The method of claim 2 wherein a ratio of particle size of said Si powder and particle size of said flux ranges between 0.7 to 1.3, inclusive.

4. The method of claim 3 wherein a ratio of specific gravity of said Si powder and specific gravity of said flux ranges between 0.7 and 1.3, inclusive.

5. An aluminum brazing method comprising the steps of: coating an aluminum type surface with a brazing material comprising a mixture of flux, binder, alcohol and a powder consisting essentially of a metal chosen from the group consisting of Zn, Cu and Ge; and brazing thereon.

6. The method of claim 5 wherein average particle size of said metal powder is within a range of 2 to 60 $\mu$m.

7. The method of claim 6 wherein a ratio of particle size of said metal powder and particle size of said flux ranges between 0.7 to 1.3, inclusive.

8. The method of claim 7 wherein a ratio of specific gravity of said metal powder and specific gravity of said flux ranges between 0.7 and 1.3, inclusive.

* * * * *